US010519960B2

(12) United States Patent
Kelly et al.

(10) Patent No.: US 10,519,960 B2
(45) Date of Patent: Dec. 31, 2019

(54) FAN FAILURE DETECTION AND REPORTING

(71) Applicant: Microsoft Technology Licensing, LLC, Redmond, WA (US)

(72) Inventors: Bryan D. Kelly, Carnation, WA (US); Brandon A. Rubenstein, Lynnwood, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 642 days.

(21) Appl. No.: 15/175,844

(22) Filed: Jun. 7, 2016

(65) Prior Publication Data

US 2017/0350403 A1    Dec. 7, 2017

(51) Int. Cl.
*F04D 27/00* (2006.01)
*F04D 29/58* (2006.01)

(52) U.S. Cl.
CPC ......... *F04D 27/001* (2013.01); *F04D 27/004* (2013.01); *F04D 29/582* (2013.01)

(58) Field of Classification Search
None
See application file for complete search history.

(56) References Cited

U.S. PATENT DOCUMENTS

| | | | |
|---|---|---|---|
| 6,407,672 B1 | 6/2002 | Grenz et al. | |
| 6,725,132 B2 * | 4/2004 | Frankel | G05D 23/1902 361/695 |
| 7,142,125 B2 | 11/2006 | Larson et al. | |
| 7,239,968 B2 | 7/2007 | Fasullo et al. | |
| 7,424,396 B2 | 9/2008 | Dodeja et al. | |
| 7,667,967 B1 | 2/2010 | Copeland et al. | |
| 8,190,396 B2 | 5/2012 | Yanao | |

(Continued)

FOREIGN PATENT DOCUMENTS

WO    2010148362 A1    12/2010

OTHER PUBLICATIONS

"International Search Report and Written Opinion Issued in PCT Application No. PCTUS/2017/035335", dated Aug. 3, 2017, 13 Pages.

(Continued)

*Primary Examiner* — Igor Kershteyn
*Assistant Examiner* — Juan G Flores
(74) *Attorney, Agent, or Firm* — Fiala & Weaver P.L.L.C.

(57) ABSTRACT

A fan failure detection and reporting system organizes fans having similar characteristics into groups. The system establishes, for a given fan group, one or more reference characteristics and identifies, for each reference characteristic, a measure of tolerance. The system identifies as a problem fan a fan having a performance characteristic, obtained via monitoring, which exceeds a corresponding reference characteristic for the group to which the fan belongs by the measure of tolerance for the corresponding reference characteristic, and generates a notification that at least identifies the problem fan. In embodiments, the system is capable of determining the fan characteristics that are used for grouping and for identifying problem fans by monitoring the fans during operation thereof. Consequently, the system is capable of detecting problem fans even when the system initially has limited or no knowledge concerning the fans.

20 Claims, 9 Drawing Sheets

(56) References Cited

U.S. PATENT DOCUMENTS

| 8,788,111 | B2 | 7/2014 | Uhlmann et al. |
|---|---|---|---|
| 2004/0130868 | A1 | 7/2004 | Schwartz et al. |
| 2007/0081888 | A1* | 4/2007 | Harrison ............... F04D 19/007 |
| | | | 415/47 |
| 2011/0014061 | A1 | 1/2011 | Hopkins et al. |
| 2013/0147631 | A1 | 6/2013 | Wu et al. |
| 2013/0156576 | A1 | 6/2013 | Warren et al. |
| 2013/0288588 | A1 | 10/2013 | Shih et al. |
| 2014/0111218 | A1 | 4/2014 | Krishnamoorthy et al. |

OTHER PUBLICATIONS

"Fan Speed Control Is Cool!", Published on: Apr. 27, 2011 Available at: https://www.maximintegrated.com/en/app-notes/index.mvp/id/1784.

"Cooling System", Retrieved on: Oct. 27, 2015 Available at: http://www.cisco.com/c/en/us/td/docs/routers/crs/crs1/8_slot/system/description/sysdesc/hq6345_3.pdf.

* cited by examiner

FAN FAILURE DETECTION AND REPORTING

BACKGROUND

Fans are often used to cool electronic devices and thereby prevent such devices from overheating. For example, in data centers, fans play a critical role in ensuring that servers do not overheat. Such fans may include but are not limited to fans that are installed within tower servers and rack servers and used to cool internal components thereof, chassis-mounted fans used to cool blade servers and other electronic components housed within a chassis, rack-mounted fans used to cool servers and other electronic components housed within a rack, and large fans used as part of data center air conditioning and air handling systems.

In many data centers, the fans that are used to cool servers can be removed and replaced by other fans having different characteristics. For example, a chassis-mounted fan that can run at a maximum speed of 5,000 revolutions per minute (RPM) may be removed and replaced by a fan that can run at a maximum speed of 7,000 RPM. This ability to swap out fans enables a party that manages the data center to selectively install a variety of different types of fans (e.g., fans made by different manufacturers, different models of fans made by the same manufacturer, and other fans having different characteristics) depending on a variety of factors including cost and performance. For example, one party may opt to install fans that provide the highest possible performance regardless of the cost. Another party may opt to install fans that provide only the level of performance necessary for adequate server cooling, thereby conserving cost.

SUMMARY

A fan failure detection and reporting system is described herein that is configured to organize fans having similar characteristics into groups. The fan failure detection and reporting system is further configured to establish, for a given fan group, one or more reference characteristics and to identify, for each reference characteristic, a measure of tolerance. The fan failure detection and reporting system is still further configured to identify as a problem fan a fan that has at least one performance characteristic, obtained via monitoring, that differs from a corresponding reference characteristic for the group to which the fan belongs by an amount that exceeds the measure of tolerance for the corresponding reference characteristic, and to generate a notification that at least identifies the problem fan. In embodiments, the fan failure detection and reporting system is advantageously capable of determining the fan characteristics that are used for grouping and for identifying problem fans by monitoring the fans during operation thereof. Consequently, the fan failure detection and reporting system is capable of detecting problem fans even when the system initially has limited or no knowledge concerning the fans.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
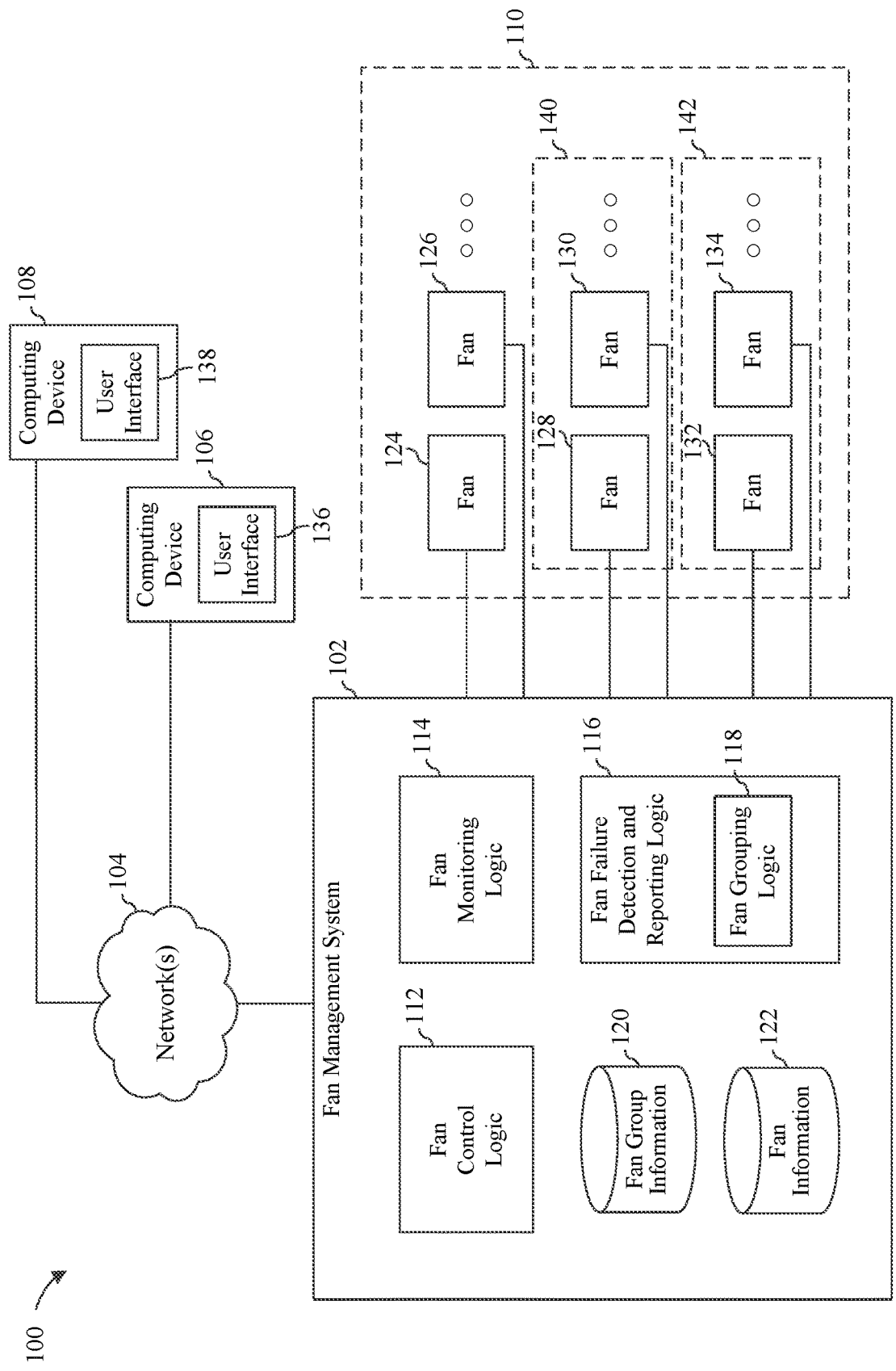
FIG. 1 is a block diagram of a cooling system that comprises a fan management system that includes fan failure and detection reporting logic in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Fans are often used to cool electronic devices and thereby prevent such devices from overheating. For example, in data centers, fans play a critical role in ensuring that servers do not overheat. Such fans may include but are not limited to fans installed within tower and rack servers and used to cool internal components thereof, chassis-mounted fans used to cool blade servers and other electronic components housed within a chassis, rack-mounted fans used to cool servers and other electronic components housed within a rack, and large fans used as part of data center air conditioning and air handling systems.

In many data centers, the fans that are used to cool servers can be removed and replaced by other fans having different characteristics. For example, a chassis-mounted fan that can run at a maximum speed of 5,000 RPM may be removed and replaced by a fan that can run at a maximum speed of 7,000 RPM. This ability to swap out fans enables a party that manages the data center to selectively install a variety of different types of fans (e.g., fans made by different manufacturers, different models of fans made by the same manufacturer, and other fans having different characteristics) depending on a variety of factors including cost and performance. For example, one party may opt to install fans that provide the highest possible performance regardless of the cost. Another party may opt to install fans that provide only the level of performance necessary for adequate server cooling, thereby conserving cost.

It may be deemed desirable to monitor the performance of one or more installed fans to detect fans that have failed as well as fans that are operating in a manner that is abnormal, sub-optimal, unsatisfactory, or indicative of a future fan failure (also generally referred to herein as "problem fans"). This is especially true where the fans themselves do not have a built-in diagnostic control unit. In an environment such as that described above, in which a variety of different fan types can be installed within a given server, chassis, rack, or data center, it is possible that the expected characteristics of an installed fan or group of fans will be unknown to the monitoring entity. In such a case, absent a very low level of performance or total shutdown of a fan, it becomes difficult if not impossible to determine whether a fan is operating as expected, since there is no data concerning expected characteristics against which to compare the monitored performance of the fan.

A fan failure detection and reporting system is described herein that addresses these and other issues with conventional fan-based cooling systems. The fan failure detection and reporting system is configured to organize fans having similar characteristics into groups. The fan failure detection and reporting system is further configured to establish, for a given fan group, one or more reference characteristics and to identify, for each reference characteristic, a measure of tolerance. The fan failure detection and reporting system is still further configured to identify as a problem fan a fan that has at least one performance characteristic, obtained via monitoring, that differs from a corresponding reference characteristic for the group to which the fan belongs by an amount that exceeds the measure of tolerance for the corresponding reference characteristic, and to generate a notification that at least identifies the problem fan.

In embodiments, the fan failure detection and reporting system is advantageously capable of determining the fan characteristics that are used for grouping and for identifying problem fans by monitoring the fans during operation thereof. Consequently, the fan failure detection and reporting system is capable of detecting problem fans even when the system initially has limited or no knowledge concerning the fans. These, and other advantages of the fan failure and detection reporting system, will be discussed in further detail herein.

Section II describes example various example cooling systems, each of which include a fan failure detection and reporting system having features similar to those mentioned above. Section II also describes example methods of operation of such fan failure detection and reporting systems. Section III describes an example processor-based computer system that may be used to implement various embodiments described herein. Section IV describes some additional exemplary embodiments. Section V provides some concluding remarks.

II. Example Systems and Methods for Fan Failure Detection and Reporting

FIG. 1 is a block diagram of a cooling system 100. Cooling system 100 includes a plurality of fans 110. In cooling system 100, plurality of fans 110 includes a fan 124, a fan 126, a fan 128, a fan 130, a fan 132, and a fan 134. However, plurality of fans 110 may include more or fewer fans than the number shown in FIG. 1.

Each fan in plurality of fans 110 is operable to provide cooling to one or more electronic devices by causing air (for example, cooled air) to flow toward, across, or through such device(s). For example, plurality of fans 110 may be operable to provide cooling to one or more servers within a data center, although this is merely one non-limiting example.

In one embodiment, each fan in plurality of fans 110 comprises a fan with variable speed control. For example, each fan in plurality of fans 110 may comprise a 4-wire fan with variable speed control. In accordance with such an embodiment, a first wire connected to the 4-wire fan is used to provide a constant voltage supply thereto, a second wire connected to the 4-wire fan is connected to ground, a third wire connected to the 4-wire fan is used to provide a pulse width modulated (PWM) signal thereto, the duty cycle of which determines the fan speed, and a fourth wire connected to the 4-wire fan outputs a signal from a tachometer included within the fan that can be used to measure fan speed. However, this is merely one example and persons skilled in the relevant art will appreciate that any of a wide variety of different fan types may be included in plurality of fans 110.

Each fan in plurality of fans 110 is connected to a fan management system 102 via a corresponding connector of fan management system 102. As used in this context, the term "connector" is meant to encompass any physical medium that is suitable for carrying power and/or signals between fan management system 102 and any fan in plurality of fans 110, and may include but is by no means limited to one or more wires or interfaces suitable for connecting to one or more wires. Generally speaking, fan management system 102 is configured to manage the operations of the fans in plurality of fans 110 so that a desired degree of cooling will be applied to the aforementioned electronic device(s). In the following, it is to be understood that interactions between the various components of fan management system 102 and fans 110 (e.g., activation/ deactivation of fans, controlling speed of fans, and monitoring fan performance) can be carried out via the aforementioned connectors.

As shown in FIG. 1, fan management system 102 includes fan control logic 112, fan monitoring logic 114, and fan failure detection and reporting logic 116. Each of these components may be implemented in hardware (e.g., using one or more digital and/or analog circuits), as software (e.g., software or firmware executed by one or more microprocessors or microcontrollers), or as a combination of hardware and software.

Fan control logic 112 is configured to selectively activate and deactivate each fan within plurality of fans 110 by, for example, turning on and turning off a voltage supply thereto. Fan control logic 112 may also be configured to control a speed of each fan within plurality of fans 110 when each fan is activated by, for example, varying a duty cycle of a PWM signal that is provided to each fan via a wire as discussed above. In an embodiment, fan control logic 112 is configured to monitor temperature data associated with the aforementioned electronic device(s), obtained from one or more temperature sensors, and to activate or deactivate the fans and/or drive the fans to a desired fan speed based on such temperature data.

Fan monitoring logic 114 is configured to receive data from one or more sensors included in or located proximal to each fan in plurality of fans 110. For example, fan monitoring logic 114 may receive a signal generated by a tachometer included within each of the fans and output via a wire connected thereto, as discussed above, wherein such tachometer signal may be utilized to calculate a current speed of the fan. Other sensor data that may be received by fan monitoring logic 114 may include, but is not limited to, optical or magnetic sensor data suitable for calculating fan speed, data from an anemometer or other sensor that is suitable for measuring airflow proximal to a fan, data representative of an amount of power consumed by a fan, or the like.

Sensor data received by fan monitoring logic 114, and information derived therefrom, may be provided to fan control logic 112 for use thereby. For example, fan control logic 112 may utilize fan speed information provided by fan monitoring logic 114 as a type of feedback to determine whether a desired fan speed has been achieved for a particular fan.

Sensor data received by fan monitoring logic 114, and information derived therefrom, may also be provided to fan failure detection and reporting logic 112 for use thereby, as we will be discussed below.

Generally speaking, fan failure detection and reporting logic 116 is configured to detect problem fans among plurality of fans 110 and to report such fans to at least one user so that the problem fans can be serviced and/or replaced. As used herein, the term "problem fan" may be used to refer fans that have failed as well as fans that are operating in a manner that is abnormal, sub-optimal, unsatisfactory, or indicative of a future fan failure.

Fan failure detection and reporting logic 116 includes fan grouping logic 118. Fan grouping logic 118 is configured to organize fans within plurality of fans 110 having similar characteristics into groups. Thus, for example and as shown in FIG. 1, fan grouping logic 118 has organized fan 128 and fan 130 into a first fan group 140, and has organized fan 132 and fan 134 into a second fan group 142.

To perform this process, fan grouping logic 118 may reference fan information 122 that is stored in a memory that is included within or is otherwise accessible to fan management system 102. Fan information 122 may include user-provided information about one or more fans in plurality of fans 110. Fan information 122 may also include information about performance characteristics of one or more fans in plurality of fans 110 that has been obtained via monitoring while the fan(s) are operating. Thus, for example, information about one or more fans within plurality of fans 110 may be obtained by fan monitoring logic 114 and stored in a memory that is included within or is otherwise accessible to fan management system 102.

Fan grouping logic 118 is further configured to store information about each fan group it establishes as fan group information 120 within a memory that is included within or is otherwise accessible to fan management system 120. Fan group information 120 may include, for example, an identifier of each fan group established by fan grouping logic 118, as well as an identifier of each fan that belongs to each fan group.

Fan failure detection and reporting logic 116 is configured to establish, for each fan group identified by fan grouping logic 118, one or more reference characteristics. A reference characteristic is a characteristic that is used as a standard or benchmark for determining whether each fan in the group is operating as expected or not. Fan failure detection and reporting logic 116 is also configured to identify, for each reference characteristic, a measure of tolerance. The measure of tolerance defines the degree or amount by which a fan's monitored performance may deviate from a reference characteristic of the fan's group and still not be deemed a problem fan. The reference characteristic(s) and associated measure(s) of tolerance for a given fan group may be stored by fan failure detection and reporting logic 116 as part of fan group information 120 or separately therefrom.

As discussed above, when the fans within plurality of fans 110 are operating (e.g., during normal operation under the control of fan control logic 112), fan monitoring logic 114 will operate to pass monitored information about the fans to fan failure detection and reporting logic 116. Fan failure detection and reporting logic 116 is configured to utilize this monitored information to identify one or more problem fans. In particular, fan failure detection and reporting logic 116 is configured to identify as a problem fan a fan that has at least one performance characteristic, obtained via the aforementioned monitoring, that differs from a corresponding reference characteristic for the group to which the fan belongs by an amount that exceeds the measure of tolerance for the corresponding reference characteristic.

Fan failure detection and reporting logic 116 is further configured to report (i.e., provide information about) each problem fan to at least one user. For example, as shown in FIG. 1, fan management system 102 is connected to a computing device 106 and a computing device 108 via one or more network(s) 104. Network(s) 104 may comprise, for example, part or all of a data center fabric, a local area network (e.g., an enterprise network), a wide area network (e.g., the Internet), or some combination thereof. Network(s) 104 may include wired and/or wireless networks. Fan failure detection and reporting logic 116 may send reports about problem fans to computing device 136 and computing device 138 via network(s) 104. Such reports may be viewed or otherwise perceived by a user of computing device 106 via a user interface 136 thereof. Likewise, such reports may be viewed or otherwise perceived by a user of computing device 108 via a user interface 138 thereof. In this way, such users may be notified about the problem fans so that the problem fans can be serviced or replaced. Still other methods of reporting problem fans to user may be used.

In embodiments, fan failure detection and reporting logic 116 is capable of determining fan information that is used both for grouping fans and for identifying problem fans within groups by monitoring the fans during operation thereof (e.g., by obtaining information from fan monitoring logic 114). In accordance with such embodiments, fan failure detection and reporting logic 116 is capable of detecting problem fans even when such logic initially has limited or no knowledge concerning the fans. Further details concerning the manner of operation of fan failure detection and reporting logic 116 will be provided below.

The fan failure detection and reporting techniques described herein may be implemented in a variety of different contexts. For example, FIG. 2 is a block diagram of a cooling system 200 that comprises a chassis manager 202 that includes fan failure detection and reporting logic 216 in accordance with an embodiment.

Figure 2:
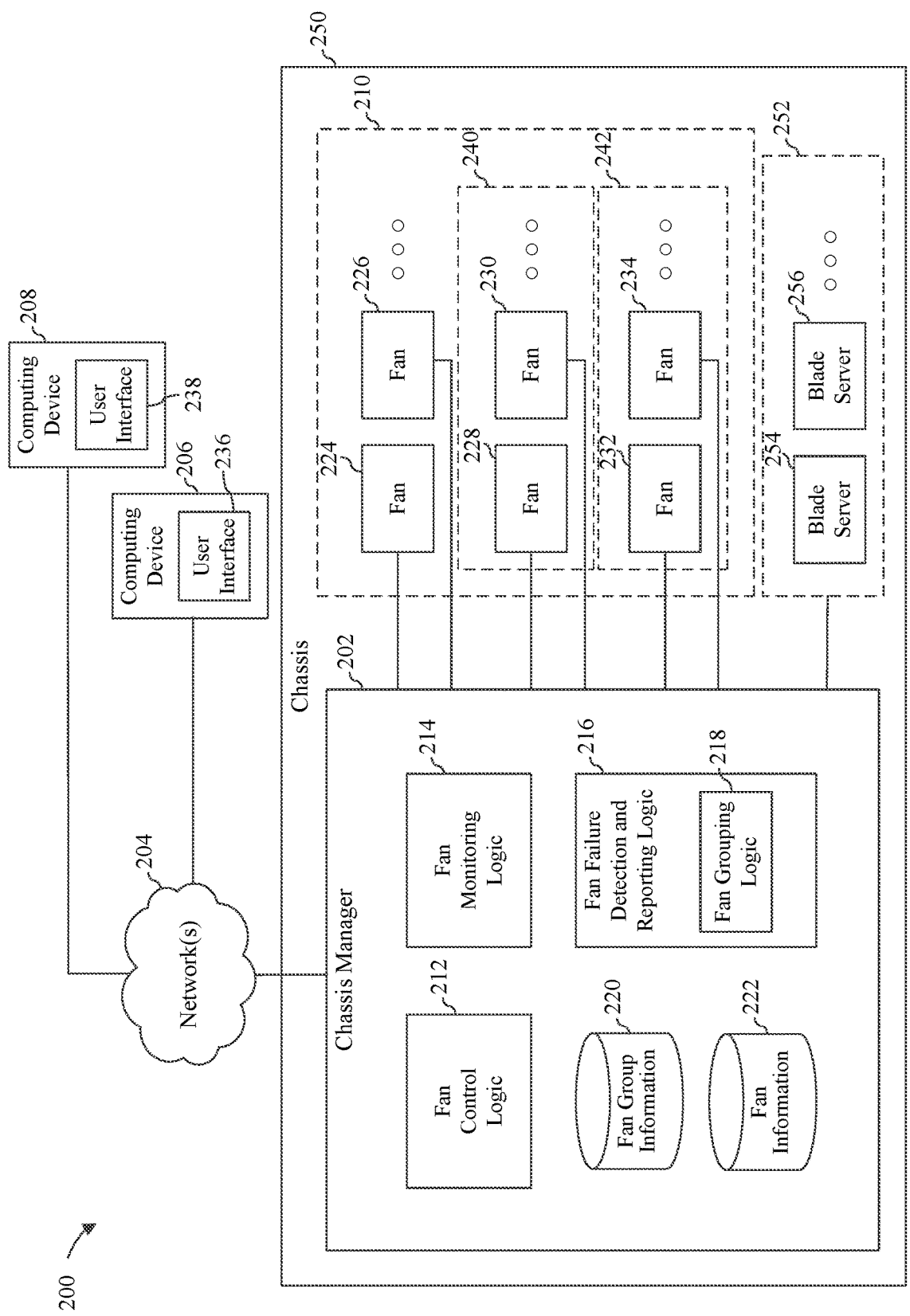
FIG. 2 is a block diagram of a cooling system that comprises a chassis manager that includes fan failure detection and reporting logic in accordance with an embodiment.

In particular, cooling system 200 of FIG. 2 includes a chassis 250 that includes a plurality of fans 210 (which include a fan 224, a fan 226, a fan 228, a fan 230, a fan 232 and a fan 234) that are used to provide cooling for a plurality of blade servers 252 (including a blade server 254 and a blade server 256) that are housed within chassis 250.

Each fan in plurality of fans 210 is connected to a chassis manager 202. Chassis manager 202 is an automated component that is housed within chassis 250. Chassis manager is configured to perform a variety of functions which include managing the operations of the fans in plurality of fans 210 so that a desired degree of cooling will be applied to plurality of blade servers 252.

As shown in FIG. 2, chassis manager 102 includes fan control logic 212, fan monitoring logic 214, and fan failure detection and reporting logic 216. Each of these components may be implemented in hardware (e.g., using one or more digital and/or analog circuits), as software (e.g., software or firmware executed by one or more microprocessors or microcontrollers), or as a combination of hardware and software. Each of these components operate in a like manner to fan control logic 112, fan monitoring logic 114, and fan failure detection and reporting logic 116, respectively, as described above in reference to FIG. 1.

Thus, for example, fan grouping logic 218 within fan failure detection and reporting logic 216 is operable to organize fans within plurality of fans 210 having similar characteristics into groups. Thus, for example and as shown in FIG. 2, fan grouping logic 218 has organized fan 228 and fan 230 into a first fan group 240, and has organized fan 232 and fan 234 into a second fan group 242. To perform this process, fan grouping logic 218 may reference fan information 222 that is stored in memory that is included within or is otherwise accessible to chassis manager 202 and is analogous to fan information 122 of FIG. 1. Fan grouping logic 218 is further configured to store information about each fan group it establishes as fan group information 220 that is included within or is otherwise accessible to chassis manager 202. Fan group information 220 is analogous to fan group information 120 of FIG. 1.

Like fan failure detection and reporting logic 116 of FIG. 1, fan failure detection and reporting logic 216 is configured to establish, for each fan group identified by fan grouping logic 218, one or more reference characteristics and to identify, for each reference characteristic, a measure of tolerance. Fan failure detection and reporting logic 216 is further configured to identify as a problem fan a fan that has at least one performance characteristic, obtained via monitoring, that differs from a corresponding reference characteristic for the group to which the fan belongs by an amount that exceeds the measure of tolerance for the corresponding reference characteristic.

Fan failure detection and reporting logic 216 is further configured to report (i.e., provide information about) each problem fan to at least one user. For example, fan failure detection and reporting logic 216 may send reports about problem fans to a computing device 206 and/or a computing device 208, each of which is connected to chassis manager 202 via one or more networks 204. Such reports may be viewed or otherwise perceived by a user of computing device 206 via a user interface 236 thereof. Likewise, such reports may be viewed or otherwise perceived by a user of computing device 208 via a user interface 238 thereof.

In a further embodiment, a similar configuration to that shown in FIG. 2 may be implemented in a rack rather than in a chassis. For example, a plurality of fans may be attached to or included within a rack and used to cool a plurality of tower or rack servers housed therein. Such fans may be connected to a rack manager that includes fan failure detection and reporting logic that operates in a like manner to fan failure detection and reporting logic 116 to identify problem fans and report the same to one or more users.

Figure 3:
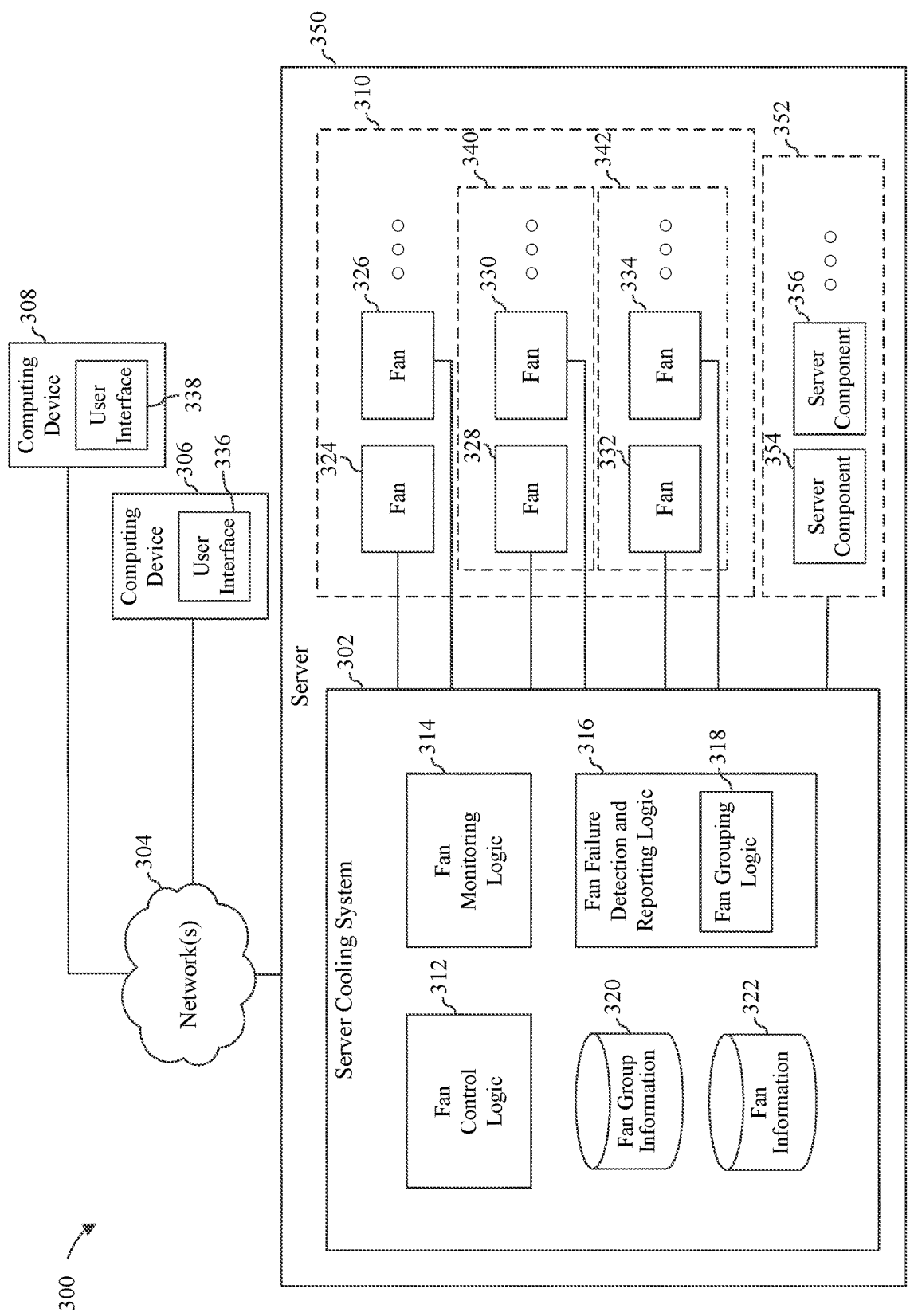
FIG. 3 is a block diagram of a cooling system that comprises a server that includes fan failure detection and reporting logic in accordance with an embodiment.

FIG. 3 provides an example of another implementation context. In particular, FIG. 3 is a block diagram of a cooling system 300 that comprises a server 350 that includes fan failure detection and reporting logic 316 in accordance with an embodiment.

In particular, cooling system 300 of FIG. 3 includes server 350 that includes a plurality of fans 310 (which include a fan 324, a fan 326, a fan 328, a fan 330, a fan 332 and a fan 334) that are used to provide cooling for a plurality of server components 352 (including a server component 354 and a server component 356) that are housed within server 350.

Each fan in plurality of fans 310 is connected to a server cooling system 302. Server cooling system 302 is configured to manage the operations of the fans in plurality of fans 310 so that a desired degree of cooling will be applied to plurality of server components 352.

As shown in FIG. 3, server cooling system 302 includes fan control logic 312, fan monitoring logic 314, and fan failure detection and reporting logic 316. Each of these components may be implemented in hardware (e.g., using one or more digital and/or analog circuits), as software (e.g., software or firmware executed by one or more microprocessors or microcontrollers), or as a combination of hardware and software. Each of these components operate in a like manner to fan control logic 112, fan monitoring logic 114, and fan failure detection and reporting logic 116, respectively, as described above in reference to FIG. 1.

Thus, for example, fan grouping logic 318 within fan failure detection and reporting logic 316 is operable to organize fans within plurality of fans 310 having similar characteristics into groups. Thus, for example and as shown in FIG. 3, fan grouping logic 318 has organized fan 328 and fan 330 into a first fan group 340, and has organized fan 332 and fan 334 into a second fan group 342. To perform this process, fan grouping logic 318 may reference fan information 322 that is stored in memory that is included within or is otherwise accessible to server cooling system 302 and is analogous to fan information 122 of FIG. 1. Fan grouping logic 318 is further configured to store information about each fan group it establishes as fan group information 320 that is stored in memory that is included within or is otherwise accessible to server cooling system 302. Fan group information 320 is analogous to fan group information 120 of FIG. 1.

Like fan failure detection and reporting logic 116 of FIG. 1, fan failure detection and reporting logic 316 is configured to establish, for each fan group identified by fan grouping logic 318, one or more reference characteristics and to identify, for each reference characteristic, a measure of tolerance. Fan failure detection and reporting logic 316 is further configured to identify as a problem fan a fan that has at least one performance characteristic, obtained via monitoring, that differs from a corresponding reference characteristic for the group to which the fan belongs by an amount that exceeds the measure of tolerance for the corresponding reference characteristic.

Fan failure detection and reporting logic 316 is further configured to report (i.e., provide information about) each problem fan to at least one user. For example, fan failure detection and reporting logic 316 may send reports about problem fans to a computing device 306 and/or a computing device 308, each of which is connected to server 350 via one or more networks 304. Such reports may be viewed or otherwise perceived by a user of computing device 306 via a user interface 336 thereof. Likewise, such reports may be viewed or otherwise perceived by a user of computing device 308 via a user interface 338 thereof.

Figure 4:
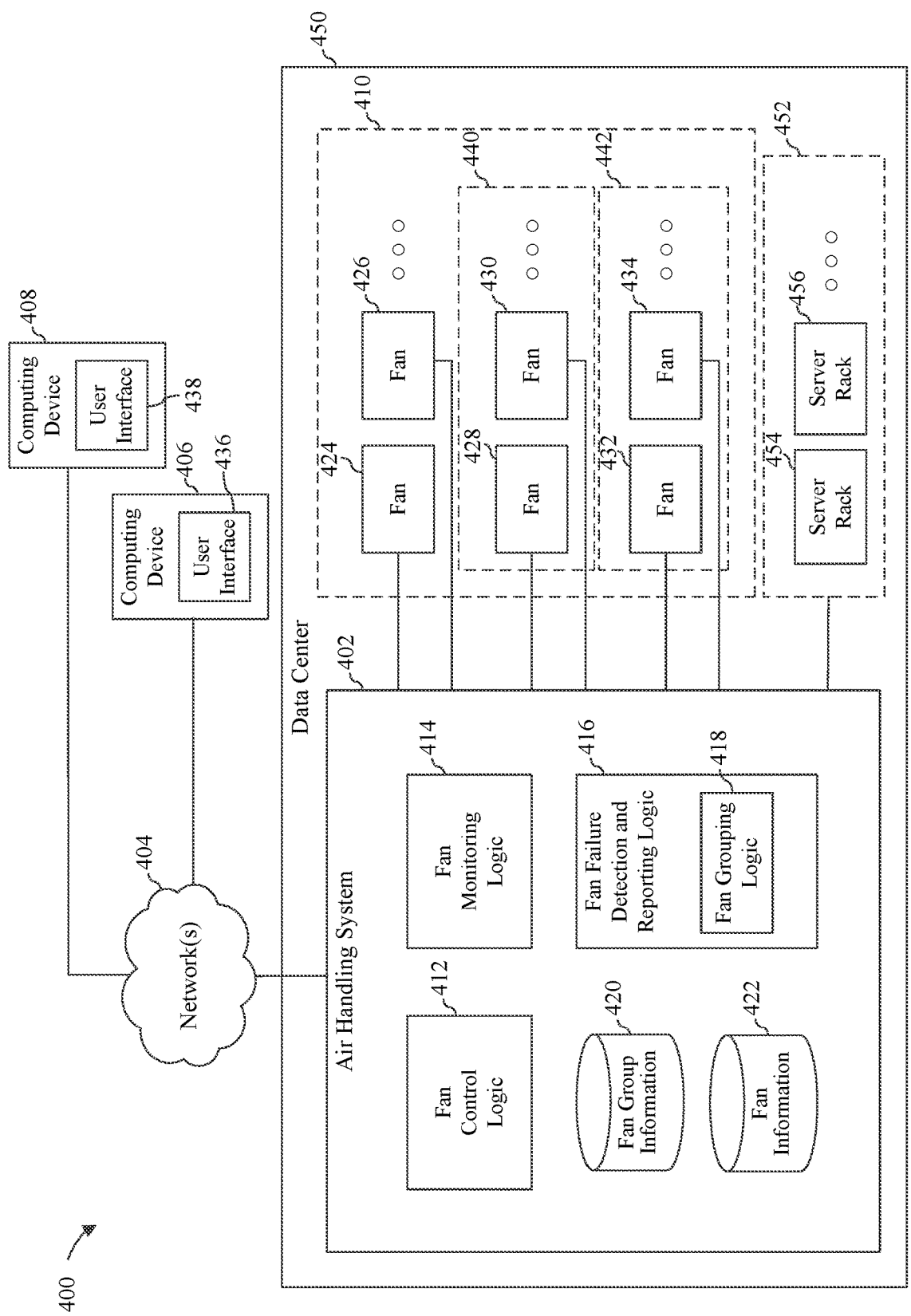
FIG. 4 is a block diagram of a cooling system that comprises an air handling system that includes fan failure detection and reporting logic in accordance with an embodiment.

FIG. 4 provides an example of yet another implementation context. In particular, FIG. 4 is a block diagram of a cooling system 400 that comprises an air handling system 402 that includes fan failure detection and reporting logic 416 in accordance with an embodiment.

In particular, cooling system 400 of FIG. 4 includes a data center 450 that includes a plurality of fans 410 (which include a fan 424, a fan 426, a fan 428, a fan 430, a fan 432 and a fan 434) that are used to provide cooling for a plurality of server racks 452 (including a server rack 454 and a server rack 456) that are housed within data center 450.

Each fan in plurality of fans 410 is connected to air handling system 402. Air handling system 402 is configured to manage the operations of the fans in plurality of fans 410 so that a desired degree of cooling will be applied to plurality of server racks 452.

As shown in FIG. 4, air handling system 402 includes fan control logic 412, fan monitoring logic 414, and fan failure detection and reporting logic 416. Each of these components may be implemented in hardware (e.g., using one or more digital and/or analog circuits), as software (e.g., software or firmware executed by one or more microprocessors or microcontrollers), or as a combination of hardware and software. Each of these components operate in a like manner to fan control logic 112, fan monitoring logic 114, and fan failure detection and reporting logic 116, respectively, as described above in reference to FIG. 1.

Thus, for example, fan grouping logic 418 within fan failure detection and reporting logic 416 is operable to organize fans within plurality of fans 410 having similar characteristics into groups. Thus, for example and as shown in FIG. 4, fan grouping logic 418 has organized fan 428 and fan 430 into a first fan group 440, and has organized fan 432 and fan 434 into a second fan group 442. To perform this process, fan grouping logic 418 may reference fan information 422 that is stored in memory that is included within or is otherwise accessible to air handling system 402 and is analogous to fan information 122 of FIG. 1. Fan grouping logic 418 is further configured to store information about each fan group it establishes as fan group information 420 within memory that is included within or is otherwise accessible to air handling system 402. Fan group information 420 is analogous to fan group information 120 of FIG. 1.

Like fan failure detection and reporting logic 116 of FIG. 1, fan failure detection and reporting logic 416 is configured to establish, for each fan group identified by fan grouping logic 418, one or more reference characteristics and to identify, for each reference characteristic, a measure of tolerance. Fan failure detection and reporting logic 416 is further configured to identify as a problem fan a fan that has at least one performance characteristic, obtained via monitoring, that differs from a corresponding reference characteristic for the group to which the fan belongs by an amount that exceeds the measure of tolerance for the corresponding reference characteristic.

Fan failure detection and reporting logic 416 is further configured to report (i.e., provide information about) each problem fan to at least one user. For example, fan failure detection and reporting logic 416 may send reports about problem fans to a computing device 406 and/or a computing device 408, each of which is connected to air handling system 402 via one or more networks 404. Such reports may be viewed or otherwise perceived by a user of computing device 406 via a user interface 436 thereof. Likewise, such reports may be viewed or otherwise perceived by a user of computing device 408 via a user interface 438 thereof.

Various ways in which fan failure detection and reporting logic 116 of cooling system 100 may operate to detect and report problem fans will now be described in reference to flowcharts of FIGS. 5-8. Persons skilled in the relevant art(s) will readily appreciate that the methods that will be described can also be performed by fan failure detection and reporting logic 216 of cooling system 200, fan failure detection and reporting logic 316 of cooling system 300, and fan failure detection and reporting logic 416 of cooling system 400. Furthermore, the described methods may also be performed by other fan-based cooling systems aside from those explicitly described herein.

Figure 5:
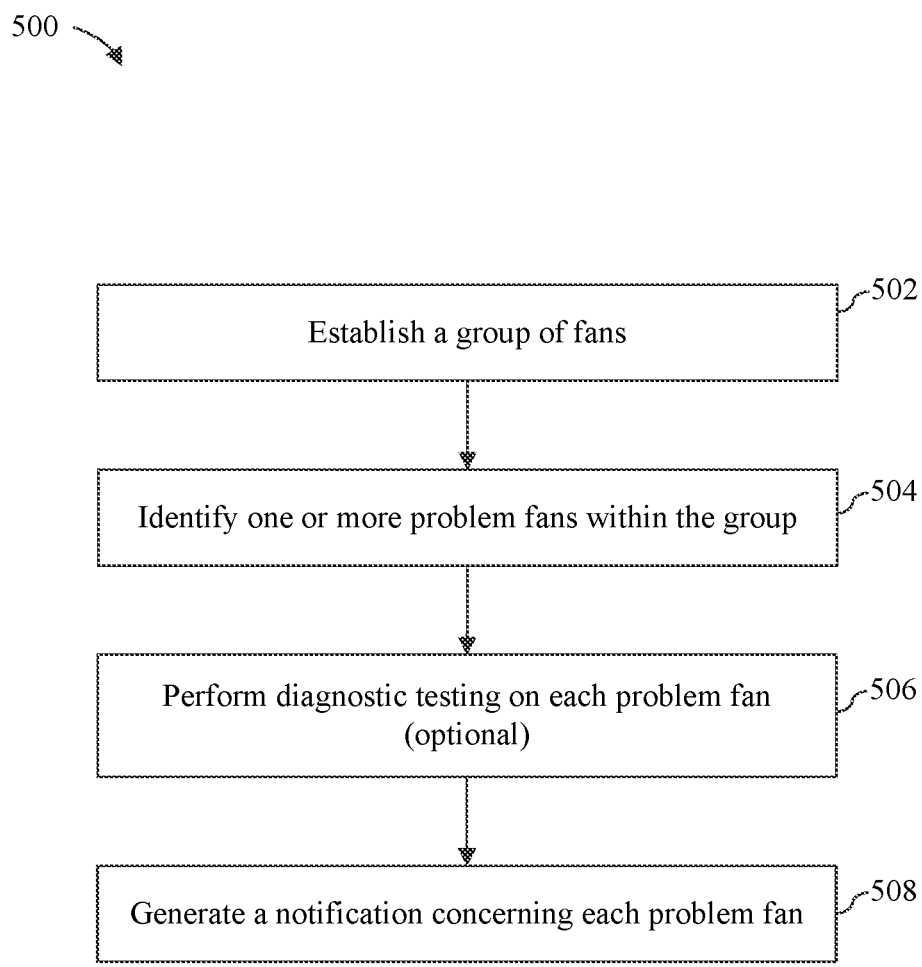
FIG. 5 depicts a flowchart of a method for detecting and reporting fans experiencing operational problems in a system that includes a plurality of fans for cooling electronic devices in accordance with an embodiment.

FIG. 5 depicts a flowchart 500 of a method for detecting and reporting fans experiencing operational problems in a system that includes a plurality of fans for cooling electronic devices in accordance with an embodiment.

As shown in FIG. 5, the method of flowchart 500 begins at step 502, in which a group of fans is established. This step may be performed, for example, by fan grouping logic 118 within fan failure detection and reporting logic 116. In further accordance with this example, fan grouping logic 118 may establish first fan group 140 that includes at least fan 128 and fan 130. Likewise, fan grouping logic 118 may establish second fan group 142 that includes at least fan 132 and fan 134.

At step 504, one or more problem fans within the group of fans established in step 502 are identified. This step may be performed, for example, by fan failure detection and reporting logic 116. In further accordance with this example, fan failure detection and reporting logic 116 may identify one or more problem fans within first fan group 140. Likewise, fan failure detection and reporting logic 116 may identify one or more problem fans within second fan group 142. As discussed above, fan failure detection and reporting logic 116 may identify as a problem fan a fan that has at least one performance characteristic, obtained via monitoring, that differs from a corresponding reference characteristic for the group to which the fan belongs by an amount that exceeds the measure of tolerance for the corresponding reference characteristic.

At step 506, which is optional, diagnostic testing may be performed on each problem fan that was identified during step 504. This step may be performed, for example, by fan failure detection and reporting logic 116. In further accordance with this example, fan failure detection and reporting logic 116 may perform diagnostic testing on each problem fan identified during step 504. Such diagnostic testing may be designed to determine, for each problem fan, a type of fan impairment, an extent of fan impairment, a severity of fan impairment, or the like.

At step 508, a notification concerning each problem fan identified during step 504 is generated. A single notification or multiple notifications may be generated depending upon the implementation. Each notification may identify one or more problem fans. The notifications may be delivered to at least one user. This step may be performed, for example, by fan failure detection and reporting logic 116. In accordance with this step, information sufficient to identify each problem fan may be conveyed via any suitable communication medium to a user. Such reporting may enable each problem fan to be scheduled for service and/or replacement.

Each of the foregoing steps of flowchart 500 will now be described in more detail in the sub-sections below.

A. Establishing Groups of Fans

Different techniques may be utilized by fan grouping logic 118 within fan failure detection and reporting logic 116 to assign fans to a fan group. For example, in one embodiment, fan grouping logic 118 may be configured to assign all the fans within a given server, chassis, or rack to the same group. In this case, the underlying assumption is that all of the fans that have been installed within the server, chassis or rack are of the same type. Based on this assumption, it is reasonable to expect that the fans will have similar characteristics. Similar logic may be used to assign fans that share some physical and/or logical characteristic within a given server, chassis, or rack (e.g., fans within the same bank or row of fans) to the same fan group.

In another embodiment, fan grouping logic 118 is configured to group fans based on user-provided or user-input fan information for each fan. For example, with regard to the embodiment of FIG. 1, a user of computing device 106 may interact with user interface 136 to input information for one or more fans in plurality of fans 110. Likewise, a user of computing device 108 may interact with user interface 138 to input information for one or more fans in plurality of fans 110. Still other methods may be used to input fan information. The information submitted by a user may be stored as part of fan information 122 and utilized by fan grouping logic 118 to determine fan groupings.

User-input fan information may include, for example and without limitation, a fan manufacturer identifier, a fan model identifier, a fan operating voltage, tachometer output signal characteristics, and PWM control input signal characteristics. User-input fan information may further include one or more expected performance characteristics for each fan. Such expected performance characteristics may include but are not limited to an expected maximum fan speed (e.g., fan speed at 100% duty cycle), an expected minimum fan speed and corresponding duty cycle, an expected fan speed at a given duty cycle or a function that provides the same, an expected ramp-up time (i.e., the time it takes for the fan speed to stabilize after increasing the duty cycle from a first value to a second, and greater, value), and expected ramp-down time (i.e., the time it takes for the fan speed to stabilize after reducing the duty cycle from a first value to a second, and lesser, value).

In general, fan grouping logic 118 may assign fans having the same or similar user-input fan information to the same fan groups. Thus, for example, all fans having the same manufacturer and model identifiers may be assigned to the same group. As another example, all fans having the same expected maximum fan speed may be assigned to the same group. However, these are merely a few examples, and persons skilled in the relevant art(s) will appreciate that any subset or combination of user-input fan information may be used to assign fans to fan groups.

In another embodiment, fan grouping logic 118 may assign fans to groups based on fan information that is automatically collected by monitoring the fans during operation thereof. In accordance with such an embodiment, while the fans are operating, fan monitoring logic 114 may operate to collect data from each of the fans that can then be stored and used by fan grouping logic 118 to establish fan groups. For example, such an embodiment may assign one or more fans to a fan group based exclusively on automatically-collected fan information, and without using any user-input fan information.

Examples of fan information that can be determined through monitoring include but are not limited to a maximum fan speed (e.g., fan speed at 100% duty cycle), a minimum fan speed and corresponding duty cycle, an expected fan speed at a given duty cycle, an expected ramp-up time, and expected ramp-down time. For example, the ramp-up time may be measured from a full-stop (0 RPM) until a fan reaches 10%, 25%, 37%, 50%, 90%, or 95% of a maximum recorded speed for that fan at full duty cycle. The ramp-up time may be measured from a stable lower RPM (e.g., 25%, 37%, 50% duty cycle) to a stable higher RPM (e.g., 50%, 37%, 80%, 100% duty cycle). As used in this context, the term "stable" is intended to denote an average speed that does not vary widely over a given time period, as opposed to an instantaneous speed which may vary continuously over time. Still other fan information that may be determined through monitoring include but are not limited to power consumption, airflow proximal to a fan, or the like. Still other fan information that may be determined through monitoring include but are not limited to measured fan speed changes that correspond to environmental changes. For example, if there are 200 fans with substantially similar performance characteristics within a data center, and the static pressure changes for a period of time, and only half the fans exhibit a particular change in performance characteristics, then a grouping may be based on the grouped factors (e.g., measured performance at each of two static pressures).

In general, fan grouping logic 118 may assign fans having the same or similar fan performance characteristics obtained through monitoring to the same fan groups. Thus, for example, all fans having a same or similar maximum fan speed may be assigned to the same group. As another example, all fans having a same or similar duty-cycle-to-fan-speed relationship may be assigned to the same group. However, these are merely a few examples, and persons skilled in the relevant art(s) will appreciate that any subset or combination of fan characteristics obtained through monitoring may be used to assign fans to fan groups.

In further embodiments, fan grouping logic 118 may rely on a combination of user-input fan information and automatically-detected fan information to assign fans to fan groups. This may be particularly valuable where fans having a single manufacturer and model identifier combination have different groupings of performance characteristics (e.g., due to fans being from multiple manufacturing sites, multiple manufacturing runs, or having hardware changes without externally identifiable changes or labels). For example, fans having the same manufacturer as specified via user input and a same or similar maximum fan speed as determined by monitoring fan operation may initially be assigned to the same group. In certain embodiments, fan information obtained through monitoring may be given precedence over user-input fan information in case the user-input fan information is out of date, has multiple groupings of performance characteristics, or was entered erroneously.

Figure 6:
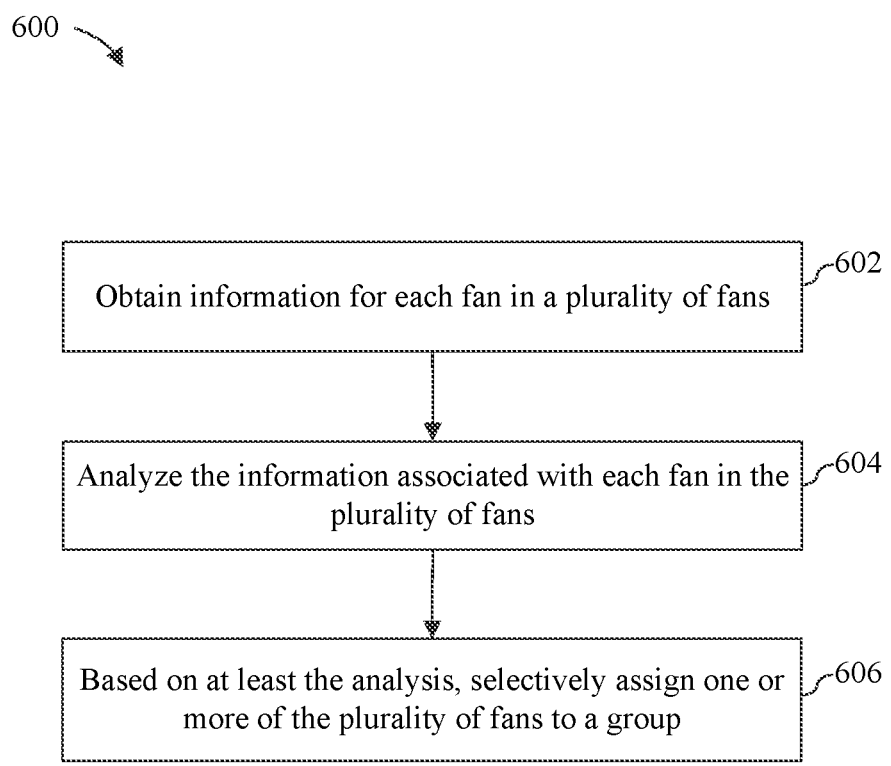
FIG. 6 depicts a flowchart of a method for assigning fans in a cooling system to one or more groups in accordance with an embodiment.

To help further illustrate the foregoing, FIG. 6 depicts a flowchart 600 of a method for assigning fans in a cooling system to one or more groups in accordance with an embodiment. The method of flowchart 600 may be performed, for example, by fan grouping logic 118 within fan failure detection and reporting logic 116 of FIG. 1. However, the method is not limited to that embodiment.

As shown in FIG. 6, the method of flowchart 600 begins at step 602 in which information is obtained for each fan in a plurality of fans. As discussed above, such information may be obtained from a user via user input or from monitoring of each fan in the plurality of fans during operation thereof. Still other techniques may be used for obtaining information for each fan. For example, an automated search against an online database may be used to collect the information for each fan. As another example, a discovery protocol may be carried out with each fan via which each fan self-reports some information about itself.

At step 604, the information associated with each fan in the plurality of fans is analyzed. This analysis may be carried out, for example, to identify fans that have the same or similar information. For example, this analysis may be carried out to identify fans that have a same or similar manufacturer or model identifier. As another example, this analysis may be carried out to identify fans that have a same or similar performance characteristic (e.g., same or similar maximum fan speed, same or similar duty-cycle-to-fan-speed relationship, or same or similar ramp-up or ramp-down time). In at least some implementations, similar performance characteristic analysis may include correlated environmental characteristics, such as static pressure or temperature, which may help group similar fans.

At step 606, based on at least the analysis carried out during step 604, one or more fans of the plurality of fans are assigned to a group. For example, during this step, fans that are determined to have one or more characteristics or other information that are the same or similar may be assigned to the same group.

In certain embodiments, a fan group may be established base on a similarity of characteristics or other information between at least one physical fan and at least one logical fan. As used herein, the term "logical fan" is used to refer to a software-based representation or model of a fan. For example, fan management system 102 may maintain one or more logical fans, each of which is a model or representation of a real-world physical fan. These logical fans may be, for example, software-based representations or models of fans included in a qualified component list (QCL) for a data center. If one or more fans are determined to be similar to a logical fan, then such fan(s) may be added to a fan group associated with that logical fan. Logical fans themselves may be added to fan groups, and the performance of such logical fan(s) may be monitored as part of identifying problem fans as will be discussed in the following subsection.

In another embodiment, fans may assigned to groups by a suitable machine learning algorithm. Such machine learning algorithm may be trained offline and/or online to identify features or characteristics of fans that are indicative of whether such fans will perform in a like manner during operation.

In a further embodiment, information about fan groups are maintained in nonvolatile memory so that they can be referenced after the system is powered down and then powered up again. Information for each fan group may also be maintained. This maintained information can be used to assign a newly-installed fan to an existing fan group. Such maintained information may also be used to create a logical fan that represents a group and newly-installed fans may be assigned to the group based on a determined similarity between characteristics of the new fans and those of the logical fan.

B. Identifying Problem Fans within a Fan Group

Different techniques may be utilized by fan failure detection and reporting logic 116 to identify problem fans within a given fan group. For example, FIG. 7 depicts a flowchart 700 of a first method for identifying problem fans within a given fan group in accordance with an embodiment.

Figure 7:
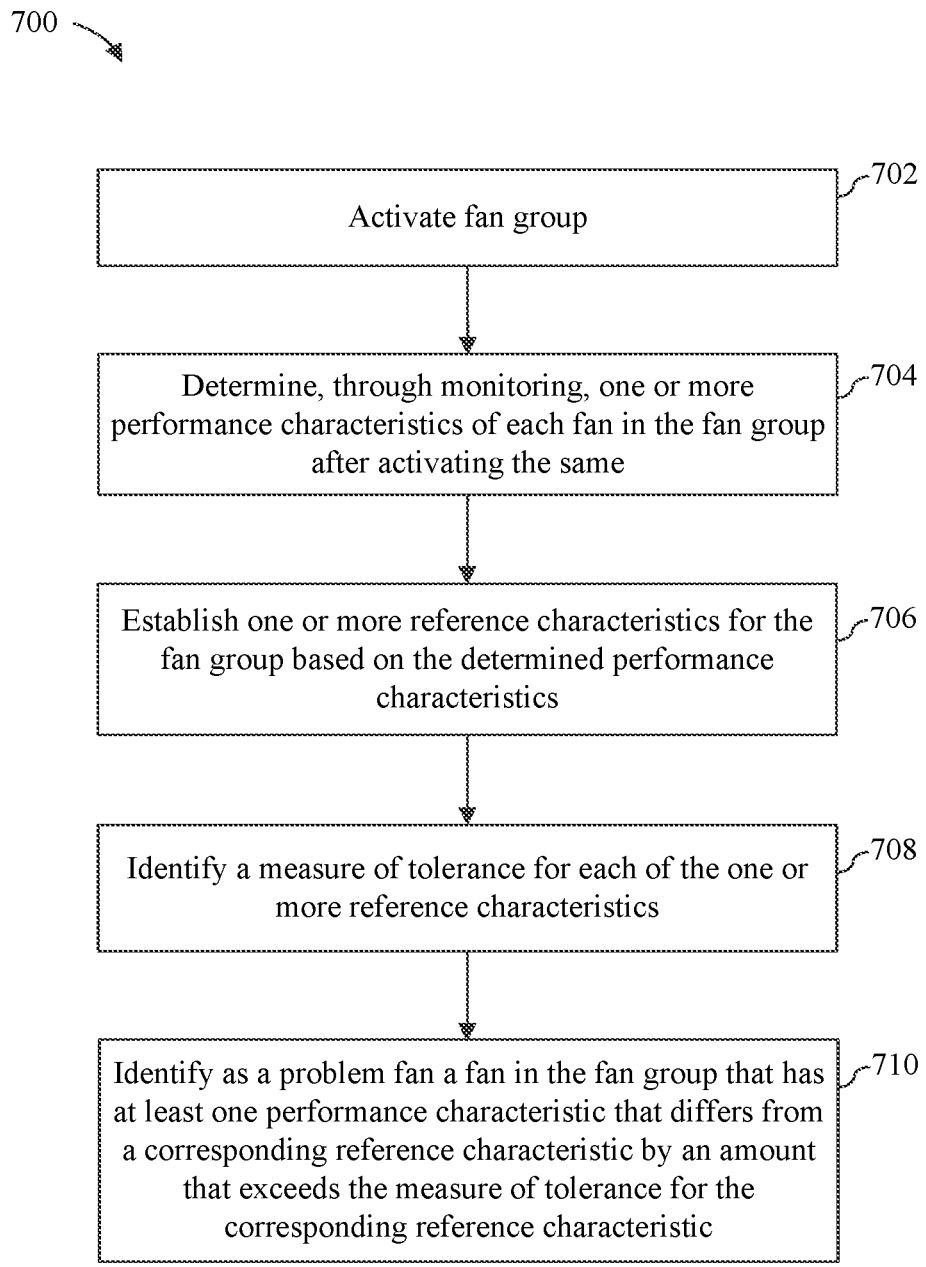
FIG. 7 depicts a flowchart of a first method for identifying problem fans within a given group of fans in accordance with an embodiment.

As shown in FIG. 7, the method of flowchart 700 begins at step 702 in which a fan group is activated. Activating the fan group in step 702 may comprise supplying an operating voltage to each fan in the fan group. Activating the fan group in step 702 may also comprise driving a PWM signal having a particular duty cycle to each fan in the fan group to obtain a target fan speed.

The fan group may be activated in step 702, for example, as part of normal or routine operation of the cooling system to which the fan group belongs. Thus, for example and with continued reference to cooling system 100 of FIG. 1, the fan group may be activated by fan control logic 112 based on a determination that one or more temperature readings have exceeded a threshold or based on a predetermined fan activation schedule. However, these examples are not intended to be limiting and in alternate embodiments, the activation of the fan group in 702 may be carried out as part of a diagnostic process. For example, the activation of the fan group in 702 may be carried out as part of a diagnostic process that is designed to identify problem fans within a cooling system.

At step 704, one or more performance characteristics are obtained through monitoring for each fan in the fan group after each fan has been activated. In one embodiment, such monitoring is initiated at some predetermined time after a PWM signal having a requisite duty cycle has been driven to the fans, thereby allowing for a fan ramp delay.

The performance characteristics that may be obtained through monitoring for each fan in the fan group during step 704 may include but are not limited to a maximum fan speed (e.g., fan speed at 100% duty cycle), a minimum fan speed and corresponding duty cycle, an expected fan speed at a given duty cycle, an expected ramp-up time (i.e., the time it takes for the fan speed to stabilize after increasing the duty cycle from a first value to a second, and greater, value), and expected ramp-down time (i.e., the time it takes for the fan speed to stabilize after reducing the duty cycle from a first value to a second, and lesser, value). Still other performance characteristics that may be determined through monitoring include but are not limited to power consumption, airflow proximal to a fan, or the like.

At step 706, one or more reference characteristics are established for the fan group based on the performance characteristics determined during step 704. As noted above, a reference characteristic is a characteristic that is used as a standard or benchmark for determining whether each fan in the fan group is operating as expected or not.

In an embodiment, a reference characteristic is determined by comparing and/or combining performance characteristics for multiple fans within a given fan group. For example and without limitation, a reference maximum fan speed for a fan group may be determined by comparing information for some or all of the fans in the fan group to determine which fan has the greatest maximum fan speed and then using that greatest maximum fan speed as the reference maximum fan speed for the fan group. As another example, a reference maximum fan speed for the fan group may be determined by calculating an average or median maximum fan speed for some or all of the fans in the fan group and then using that average or median value as the reference maximum fan speed for the fan group. Similar comparison-based or combination-based approaches may be used to determine a reference fan speed at a given duty cycle for the fan group, a reference ramp-up time for the fan group, or a reference ramp-down time for the fan group.

In certain embodiments, data may be collected from one or more logical fans included within a given fan group and also used to determine a reference characteristic for that fan group. For example, a logical fan may be configured to provide fan speed information (e.g., RPM or tachometer readings) for a given duty cycle setting and this fan speed information may be used to determine a reference characteristic for a given fan group. In some instances a fan group may comprise only a single physical fan and one or more logical fans.

At step 708, after establishment of the one or more reference characteristics for the fan group, a measure of tolerance is identified for each of the one or more reference characteristics. The measure of tolerance for a given reference characteristic represents a degree of deviation from the reference characteristic that is deemed acceptable and thus will not result in identification of a fan as a problem fan.

In one embodiment, the measure of tolerance for a given reference characteristic may be hard-coded into the algorithm used for identifying problem fans. In another embodiment, the measure of tolerance for a given reference characteristic may be selectively configured by a user of the cooling system. For example, the measure of tolerance may comprise an editable value within a configuration file, or may comprise a value that can be modified by a user via interaction with a suitable user interface (e.g., a command line interface, graphical user interface, or the like).

The measure of tolerance for a given reference characteristic may be selected so that it encompasses an expected deviation in a monitored fan characteristics due to reporting inaccuracy. For example, in an embodiment in which the reference characteristic is an expected fan speed at a given PWM duty cycle, the measure of tolerance may be selected to encompass an expected deviation (+/−) in monitored fan speed due to anticipated reporting inaccuracy.

The measure of tolerance for a given reference characteristic may also be selected to take into account a typical or accepted variance in performance as allowed by a given manufacturer or industry. For example, if it is typical for a fan speed to vary by +/−10%, then a measure of tolerance for a reference fan speed may be selected so that it is equal to +/−10% or greater (e.g., +/−15%).

In some embodiments, the measure of tolerance may be different depending upon the target fan speed or the actual fan speed. Thus, for example, at a relatively low duty cycle or fan speed, the measure of tolerance might be set so that it allows for a deviation of +/−8%, whereas at a relatively high duty cycle or fan speed, the measure of tolerance might be set so that it allows for a deviation of +/−3%. This approach may be used so that the cooling system will be less tolerant of degraded performance when the electronic devices in the system require a high degree of cooling. For example, if servers in the system are close to overheating, the ramifications of degraded performance may be greater.

In further embodiments, the measure of tolerance may be calculated as a function of the corresponding reference characteristic. Thus, for example, if the reference characteristic is fan speed, the measure of tolerance may be calculated using a function that causes the measure of tolerance to decrease as the fan speed increases.

It is further noted that the measure of tolerance for a given reference characteristic may be specified as a percentage of the reference characteristic (e.g., +/−10% of reference fan speed as specified in RPM) or as a raw value (e.g., +/−N RPM, where N is some value greater than zero). Also, a measure of tolerance for given reference characteristic may be set to zero, in which case the system may identify any fan in the fan group that deviates in any way from the reference characteristic as a problem fan.

At step 710, a problem fan is identified in the fan group. A problem fan is identified as a fan in the fan group that has at least one performance characteristic that differs from a corresponding reference characteristic by an amount that exceeds the measure of tolerance for the corresponding reference characteristic.

For example, a fan may be identified as a problem fan because it has a maximum fan speed or a fan speed at a given duty cycle that is lower than a reference fan speed by an amount that exceeds the measure of tolerance associated with the reference fan speed. This may indicate, for example, a fan motor that is failing or wearing out.

In another example, a fan may be identified as a problem fan because it has a maximum fan speed or a fan speed at a given duty cycle that is greater than a reference fan speed by an amount that exceeds the measure of tolerance associated with the reference fan speed. This may indicate, for example, a loss of lubricant and thus impending burn-out, or that an improper fan has been installed.

As yet another example, a fan may be identified as a problem fan because it has ramp-up or ramp-down time after switching from a first duty cycle setting to a second duty cycle setting that is greater than or less than a reference ramp-up time or reference ramp-down time by an amount that exceeds a measure of tolerance. For example, a slowing ramp time may indicate a potential air blockage or fan degradation.

However, the foregoing are merely some examples, and other types of measured deviations from a reference characteristic may be utilized to identify problem fans. Moreover, in some embodiments, a fan may be identified as a problem fan only when multiple performance characteristics thereof are determined to deviate from multiple corresponding reference characteristics by amounts that exceed the various measures of tolerance for those reference characteristics.

Figure 8:
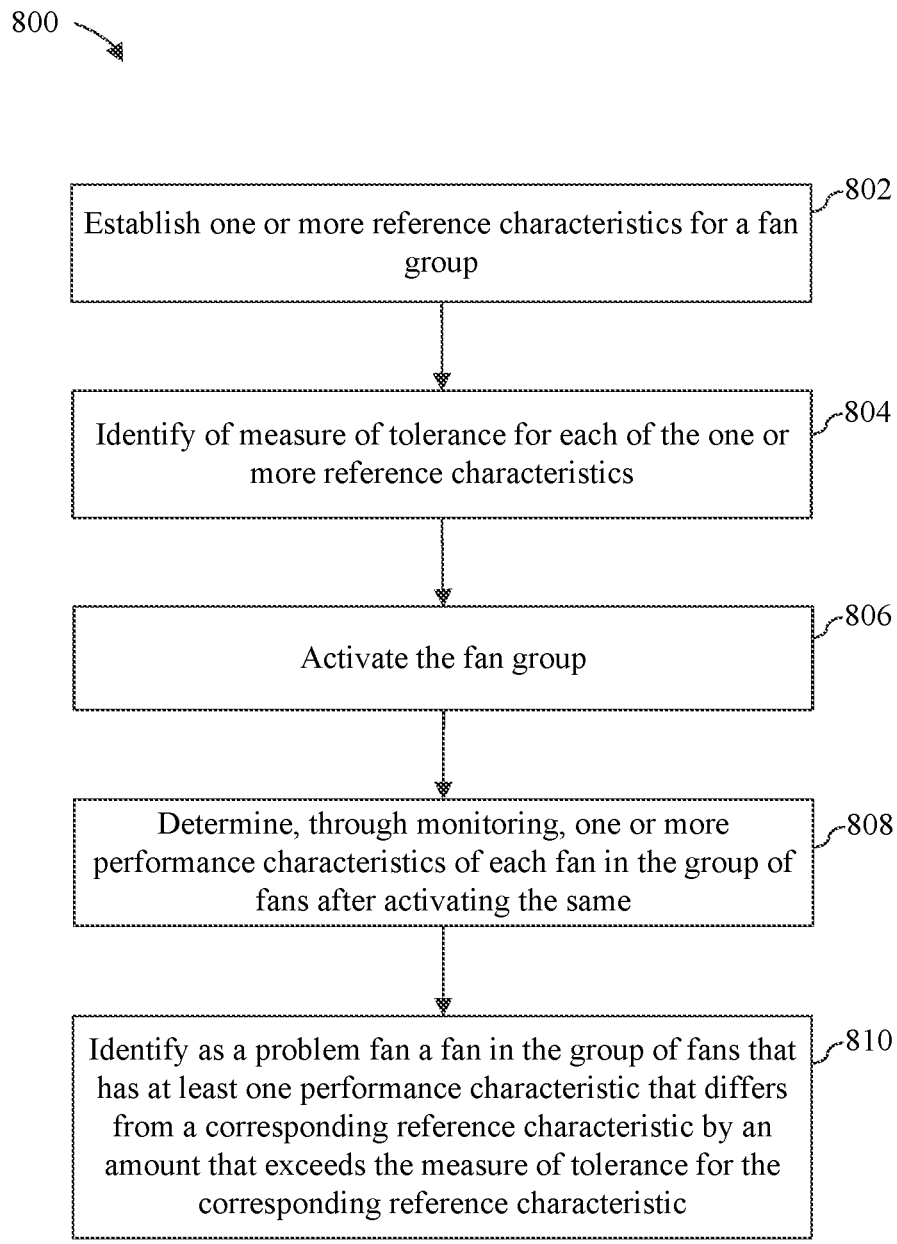
FIG. 8 depicts a flowchart of a second method for identifying problem fans within a given group of fans in accordance with an embodiment.

FIG. 8 depicts a flowchart 800 of a second method for identifying and reporting problem fans within a given group of fans in accordance with an embodiment. As shown in FIG. 8, the method of flowchart 800 begins at step 802, in which one or more reference characteristics are established for a fan group.

In the method of flowchart 800, the reference characteristic(s) may be determined based on fan information that is obtained in a variety of ways. For example, the fan information that is used to establish the reference characteristic(s) may be the same user-input or system-acquired data that was used to establish the fan group (see, e.g., the foregoing description of step 602 of flowchart 600) or information that is obtained in a like fashion. Thus, the fan information that may be used to establish the reference characteristics in step 802 is not limited to fan performance characteristics obtained through monitoring.

At step 804, a measure of tolerance is obtained for each of the one or more reference characteristics established during step 802. This step may be carried out in a like manner to step 708 of flowchart 700 as described above in reference to FIG. 7.

At step 806, the fan group is activated. This step may be carried out in a like manner to step 702 of flowchart 700 as described above in reference to FIG. 7.

At step 808, one or more performance characteristics are obtained through monitoring for each fan in the fan group after each fan has been activated. This step may be carried out in a like manner to step 704 of flowchart 700 as described above in reference to FIG. 7.

At step 810, a problem fan is identified in the fan group. A problem fan is identified as a fan in the fan group that has at least one performance characteristic that differs from a corresponding reference characteristic by an amount that exceeds the measure of tolerance for the corresponding reference characteristic. This step may be carried out in a like manner to step 710 of flowchart 700 as described above in reference to FIG. 7.

C. Performing Diagnostic Testing on Problem Fans

As was noted above in reference to step 506 of flowchart 500, diagnostic testing may be performed on each problem fan that is identified by fan failure detection and reporting logic 116. For example, fan failure detection and reporting logic 116 may perform diagnostic testing to determine, for each problem fan, a type of fan impairment, an extent of fan impairment, a severity of fan impairment, or the like.

In one embodiment, such diagnostic testing may involve the following. If a fan is determined to have a fan speed at a given duty cycle that is not within the measure of tolerance of a reference fan speed at the given duty cycle, then the fan may be ramped through different duty cycle settings up to a maximum duty cycle (i.e., 100%) and, at each duty cycle setting, the corresponding fan speed may be compared to a reference fan speed. If it is determined that the fan exceeds the measure of tolerance at more than one duty cycle setting or at all duty cycle settings, then a severity ranking or service priority for the problem fan can be increased. However, this is only one example of diagnostic testing, and person(s) skilled in the relevant art will appreciate that a variety of other types of diagnostic testing may be applied to determine for each problem fan, a type of fan impairment, an extent of fan impairment, a severity of fan impairment, or the like.

D. Reporting Problem Fans

Once a problem fan within a fan group has been identified, a notification may be generated that at least identifies the problem fan and the notification may be delivered to one or more users so that it can be tested, serviced or replaced. Such users may comprise, for example, service engineers, technicians, or other personnel within a data center, although these are merely examples. In at least some implementations, reporting may be deferred unless a fan has been identified as a problem fan for at least a certain amount of time (e.g., 10 continuous seconds), to reduce false positive reports. In at least some implementations, that amount of time is increased when multiple fans fail simultaneously, to reduce false positives caused by environmental factors (whether measured or not). For example, a brief but significant increase in (unmeasured) static air pressure might cause RPMs on 1500 individual fans to fall outside tolerance, yet all fans except for 24 then return to expected RPMs within 20 seconds, resulting in only 24 fans being identified (rather than 1500).

A report or notification about a problem fan may include a variety of information. This information may include, for example, and without limitation, an identifier of the problem fan, an identifier of a server, chassis, rack, and/or data center zone within which the fan is located, operational data about the fan, an indication of when the operational data about the fan was obtained, an identification of which measures of tolerance were exceeded by the problem fan (and for which reference characteristics), an indication of the amount by which the problem fan exceeded a measure of tolerance, or the like. The report or notification may also include a problem severity rating or service priority that is assigned during the problem fan detection process and/or during diagnostic testing that occurred after the problem fan was identified.

A wide of variety of different automated methods may be used to convey information about a problem fan to a user. For example, such information may be published in a report that is printed or delivered to a user terminal. As another example, such information may be sent to a user device via text message, e-mail message, or alert. Such information may also be delivered to a user via a data center management application installed on or accessed from a user device. Still other methods may be used.

III. Example Computer System Implementation

Figure 9:
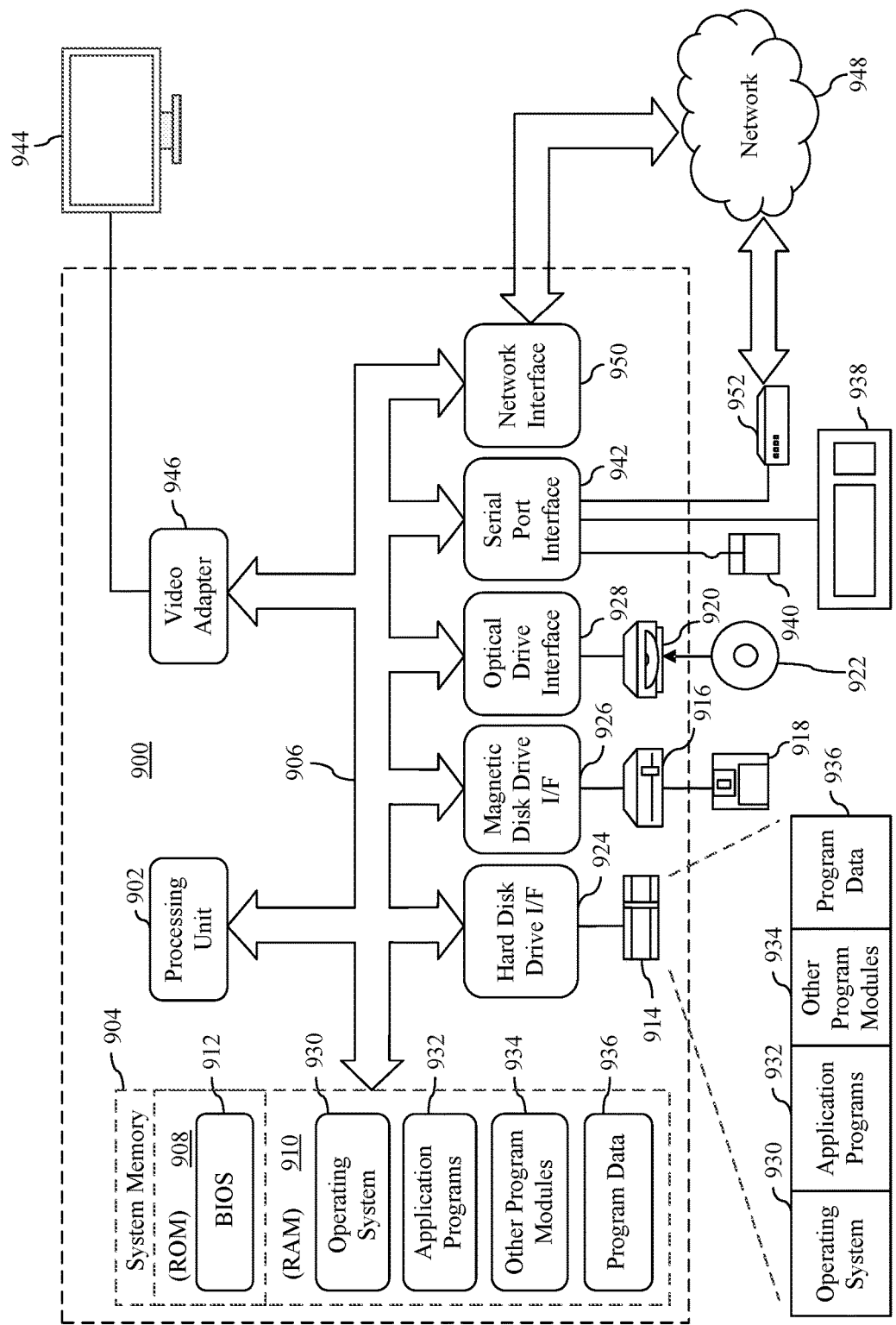
FIG. 9 is a block diagram of an example processor-based computer system that may be used to implement various embodiments.

FIG. 9 depicts an example processor-based computer system 900 that may be used to implement various embodiments described herein. For example, computer system 900 may be used to implement fan management system 102, computing device 106, computing device 108, chassis manager 202, computing device 206, computing device 208, server cooling system 302, computing device 306, computing device 308, air handling system 402, computing device 406, or computing device 408 as described above in reference to FIGS. 1-4. Computer system 900 may also be used to implement any or all of the steps of any or all of the flowcharts depicted in FIGS. 5-8. The description of computer system 900 is provided herein for purposes of illustration, and is not intended to be limiting. Embodiments may be implemented in further types of computer systems, as would be known to persons skilled in the relevant art(s).

As shown in FIG. 9, computer system 900 includes a processing unit 902, a system memory 904, and a bus 906 that couples various system components including system memory 904 to processing unit 902. Processing unit 902 may comprise one or more microprocessors or microprocessor cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer system 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to perform any or all of the functions and features of fan management system 102, computing device 106, computing device 108, chassis manager 202, computing device 206, computing device 208, server cooling system 302, computing device 306, computing device 308, air handling system 402, computing device 406, or computing device 408, as described above in reference to FIGS. 1-4. The program modules may also include computer program logic that, when executed by processing unit 902, performs any of the steps or operations shown or described in reference to the flowcharts of FIGS. 5-8.

A user may enter commands and information into computer system 900 through input devices such as a keyboard 938 and a pointing device 940. Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB). Such interfaces may be wired or wireless interfaces.

A display 944 is also connected to bus 906 via an interface, such as a video adapter 946. In addition to display 944, computer system 900 may include other peripheral output devices (not shown) such as speakers and printers.

Computer system 900 is connected to a network 948 (e.g., a local area network or wide area network such as the Internet) through a network interface or adapter 950, a modem 952, or other suitable means for establishing communications over the network. Modem 952, which may be internal or external, is connected to bus 906 via serial port interface 942.

As used herein, the terms "computer program medium," "computer-readable medium," and "computer-readable storage medium" are used to generally refer to memory devices or storage structures such as the hard disk associated with hard disk drive 914, removable magnetic disk 918, removable optical disk 922, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable computer system 900 to implement features of embodiments of the present invention discussed herein. Accordingly, such computer programs represent controllers of computer system 900.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, computer system 900 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Additional Exemplary Embodiments

A method for automatically detecting and reporting fans experiencing operational problems in a system that includes a plurality of fans for cooling electronic devices is described herein. The method includes: activating a group of fans; determining, through monitoring, one or more performance characteristics of each fan in the group of fans after activating the same; establishing one or more reference characteristics for the group of fans based on the determined performance characteristics; identifying a measure of tolerance for each of the one or more reference characteristics; identifying, as a problem fan, a fan in the group of fans that has at least one performance characteristic that differs from a corresponding reference characteristic by an amount that exceeds the measure of tolerance for the corresponding reference characteristic; and generating a notification that at least identifies the problem fan.

In one embodiment of the foregoing method, establishing the one or more reference characteristics for the group of fans based on the determined performance characteristics comprises: comparing or combining the determined performance characteristics associated with two or more fans in the group of fans.

In another embodiment of the foregoing method, establishing the one or more reference characteristics for the group of fans comprises one or more of: establishing a reference maximum fan speed for the group of fans; establishing a reference fan speed at a given duty cycle setting for the group of fans; establishing a reference ramp-up time for the group of fans, the reference ramp-up time representing an amount of time required for a speed of a fan to stabilize after switching from a first duty cycle setting to a second duty cycle setting, the second duty cycle setting being greater than the first duty cycle setting; or establishing a reference ramp-down time for the group of fans, the reference ramp-down time representing an amount of time required for a speed of a fan to stabilize after switching from a third duty cycle setting to a fourth duty cycle setting, the fourth duty cycle setting being less than the third duty cycle setting.

In yet another embodiment of the foregoing method, the group of fans comprises one or more physical fans and at one or more logical fans, wherein each logical fan comprises a software model of a fan.

In still another embodiment of the foregoing method, identifying the measure of tolerance for each of the one or more reference characteristics comprises: identifying one or more user-configurable measures of tolerance.

In a further embodiment of the foregoing method, identifying the measure of tolerance for each of the one or more reference characteristics comprises: determining a measure of tolerance for a particular one of the one or more reference characteristics as a function of a value of the particular reference characteristic.

In a still further embodiment of the foregoing method, the method further comprises: performing diagnostic testing on the problem fan.

In another embodiment of the foregoing method, generating the notification that at least identifies the problem fan comprises: associating a severity rating with the problem fan based on the results of the diagnostic testing, and including the severity rating in the notification.

A fan management system is also described herein. The fan management system comprises a plurality of connectors, fan grouping logic, and fan failure detection and reporting logic. The plurality of connectors are configured to be connected to a plurality of fans, the fan management system being operable to obtain monitored performance characteristics for each fan in the plurality of fans. The fan grouping logic is configured to analyze information associated with each fan in the plurality of fans and, based at least on the analysis, to selectively assign one or more of the plurality of fans to a group. The fan failure detection and reporting logic is configured to determine one or more reference characteristics for the group, to identify as a problem fan a fan within the group having at least one monitored performance characteristic that deviates from a corresponding one of the one or more reference characteristics by an amount that exceeds a measure of tolerance associated with the corresponding one of the one or more reference characteristics, and to generate a notification that at least identifies the problem fan.

In one embodiment of the foregoing system, at least some of the information associated with at least one fan in the plurality of fans from is provided via user input.

In another embodiment of the foregoing system, at least some of the information associated with at least one fan in the plurality of fans from is obtained via automated monitoring of the at least one fan.

In yet another embodiment of the foregoing system, the fan grouping logic is configured to analyze the information associated with each fan in the plurality of fans by analyzing one or more of: a maximum fan speed; a fan speed at one or more duty cycle settings for each fan; or a time for a speed of each fan to stabilize after switching from a first duty cycle setting to a second duty cycle setting.

In still another embodiment of the foregoing system, the fan grouping logic is configured to analyze the information associated with each fan in the plurality of fans by comparing the information associated with each fan in the plurality of fans to information associated with a software model of a fan.

A computer program product is also described herein. The computer program product comprises a computer-readable memory having computer program logic recorded thereon that when executed by at least one processor causes the at least one processor to perform a method for automatically detecting and reporting fans experiencing operational problems in a system that includes a plurality of fans for cooling electronic devices. The method comprises: establishing one or more reference characteristics for a group of fans; identifying a measure of tolerance for each of the one or more reference characteristics; activating the group of fans; determining, through monitoring, one or more performance characteristics of each fan in the group of fans after activating the same; identifying as a problem fan a fan in the group of fans that has at least one performance characteristic that differs from a corresponding reference characteristic by an amount that exceeds the measure of tolerance for the corresponding reference characteristic; and generating a notification that at least identifies the problem fan.

In one embodiment of the foregoing computer program product, establishing the one or more reference characteristics for the group of fans comprises one or more of: establishing a reference maximum fan speed for the group of fans; establishing a reference fan speed at a given duty cycle setting for the group of fans; establishing a reference ramp-up time for the group of fans, the reference ramp-up time representing an amount of time required for a speed of a fan to stabilize after switching from a first duty cycle setting to a second duty cycle setting, the second duty cycle setting being greater than the first duty cycle setting; or establishing a reference ramp-down time for the group of fans, the reference ramp-down time representing an amount of time required for a speed of a fan to stabilize after switching from a third duty cycle setting to a fourth duty cycle setting, the fourth duty cycle setting being less than the third duty cycle setting.

In another embodiment of the foregoing computer program product, the group of fans comprises one or more physical fans and at one or more logical fans, wherein each logical fan comprises a software model of a fan.

In yet another embodiment of the foregoing computer program product, identifying the measure of tolerance for each of the one or more reference characteristics comprises: identifying one or more user-configurable measures of tolerance.

In still another embodiment of the foregoing computer program product, identifying the measure of tolerance for each of the one or more reference characteristics comprises: determining a measure of tolerance for a particular one of the one or more reference characteristics as a function of a value of the particular reference characteristic.

In a further embodiment of the foregoing computer program product, the method further comprises: performing diagnostic testing on the problem fan.

In a still further embodiment of the foregoing computer program product, generating the notification that at least identifies the problem fan comprises: associating a severity rating with the problem fan based on the results of the diagnostic testing and including the severity rating in the notification.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for automatically detecting and reporting fans experiencing operational problems in a system that includes a plurality of fans for cooling electronic devices, the method comprising:
    activating a group of fans;
    determining, through monitoring, one or more performance characteristics of each fan in the group of fans after activating the same;
    establishing one or more reference characteristics for the group of fans based on the determined performance characteristics, wherein establishing the one or more reference characteristics comprises comparing or combining the determined performance characteristics associated with two or more fans in the group of fans;
    identifying a measure of tolerance for each of the one or more reference characteristics;
    identifying, as a problem fan, a fan in the group of fans that has at least one performance characteristic that differs from a corresponding reference characteristic by an amount that exceeds the measure of tolerance for the corresponding reference characteristic; and
    generating a notification that at least identifies the problem fan.

2. The method of claim 1, wherein establishing the one or more reference characteristics for the group of fans comprises one or more of:
    establishing a reference maximum fan speed for the group of fans;
    establishing a reference fan speed at a given duty cycle setting for the group of fans;
    establishing a reference ramp-up time for the group of fans, the reference ramp-up time representing an amount of time required for a speed of a fan to stabilize after switching from a first duty cycle setting to a second duty cycle setting, the second duty cycle setting being greater than the first duty cycle setting; or
    establishing a reference ramp-down time for the group of fans, the reference ramp-down time representing an amount of time required for a speed of a fan to stabilize after switching from a third duty cycle setting to a fourth duty cycle setting, the fourth duty cycle setting being less than the third duty cycle setting.

3. The method of claim 1, wherein the group of fans comprises one or more physical fans and one or more logical fans, wherein each logical fan comprises a software model of a fan.

4. The method of claim 1, wherein identifying the measure of tolerance for each of the one or more reference characteristics comprises:
    identifying one or more user-configurable measures of tolerance.

5. The method of claim 1, wherein identifying the measure of tolerance for each of the one or more reference characteristics comprises:
    determining a measure of tolerance for a particular one of the one or more reference characteristics as a function of a value of the particular reference characteristic.

6. The method of claim 1, further comprising:
    performing diagnostic testing on the problem fan.

7. The method of claim 6, wherein generating the notification that at least identifies the problem fan comprises:
    associating a severity rating with the problem fan based on the results of the diagnostic testing, and including the severity rating in the notification.

8. A computer program product comprising a computer-readable memory having computer program logic recorded thereon that when executed by at least one processor causes the at least one processor to perform a method for automatically detecting and reporting fans experiencing operational problems in a system that includes a plurality of fans for cooling electronic devices, the method comprising:
    establishing one or more reference characteristics for a group of fans by comparing or combining determined performance characteristics associated with two or more fans in the group;
    identifying a measure of tolerance for each of the one or more reference characteristics;
    activating the group of fans;
    determining, through monitoring, one or more monitored performance characteristics of each fan in the group of fans after activating the same;
    identifying as a problem fan a fan in the group of fans that has at least one monitored performance characteristic that differs from a corresponding reference characteristic by an amount that exceeds the measure of tolerance for the corresponding reference characteristic; and
    generating a notification that at least identifies the problem fan.

9. The computer program product of claim 8, wherein establishing the one or more reference characteristics for the group of fans comprises one or more of:
    establishing a reference maximum fan speed for the group of fans;
    establishing a reference fan speed at a given duty cycle setting for the group of fans;
    establishing a reference ramp-up time for the group of fans, the reference ramp-up time representing an amount of time required for a speed of a fan to stabilize after switching from a first duty cycle setting to a second duty cycle setting, the second duty cycle setting being greater than the first duty cycle setting; or
    establishing a reference ramp-down time for the group of fans, the reference ramp-down time representing an amount of time required for a speed of a fan to stabilize after switching from a third duty cycle setting to a fourth duty cycle setting, the fourth duty cycle setting being less than the third duty cycle setting.

10. The computer program product of claim 8, wherein the group of fans comprises one or more physical fans and one or more logical fans, wherein each logical fan comprises a software model of a fan.

11. The computer program product of claim 8, wherein identifying the measure of tolerance for each of the one or more reference characteristics comprises:
    identifying one or more user-configurable measures of tolerance.

12. The computer program product of claim 8, wherein identifying the measure of tolerance for each of the one or more reference characteristics comprises:
   determining a measure of tolerance for a particular one of the one or more reference characteristics as a function of a value of the particular reference characteristic.

13. The computer program product of claim 8, wherein the method further comprises:
   performing diagnostic testing on the problem fan.

14. The computer program product of claim 13, wherein generating the notification that at least identifies the problem fan comprises:
   associating a severity rating with the problem fan based on the results of the diagnostic testing and including the severity rating in the notification.

15. A fan management system, comprising:
   one or more processors;
   one or more memory devices connected to the one or more processors, the one or more memory devices storing instructions for execution by the one or more processors, the instructions comprising:
      fan monitoring logic configured to obtain monitored performance characteristics for each fan in a plurality of fans;
      fan grouping logic configured to analyze information associated with each fan in the plurality of fans and, based at least on the analysis, to selectively assign one or more of the plurality of fans to a group; and
      fan failure detection and reporting logic configured to determine one or more reference characteristics for the group by comparing or combining determined performance characteristics associated with two or more fans in the group, to identify as a problem fan a fan within the group having at least one monitored performance characteristic that deviates from a corresponding one of the one or more reference characteristics by an amount that exceeds a measure of tolerance associated with the corresponding one of the one or more reference characteristics, and to generate a notification that at least identifies the problem fan.

16. The system of claim 15, wherein at least some of the information associated with at least one fan in the plurality of fans is provided via user input.

17. The system of claim 15, wherein at least some of the information associated with at least one fan in the plurality of fans from is obtained via automated monitoring of the at least one fan.

18. The system of claim 15, wherein the fan grouping logic is configured to analyze the information associated with each fan in the plurality of fans by analyzing one or more of:
   a maximum fan speed;
   a fan speed at one or more duty cycle settings for each fan; or
   a time for a speed of each fan to stabilize after switching from a first duty cycle setting to a second duty cycle setting.

19. The system of claim 15, wherein the fan grouping logic is configured to analyze the information associated with each fan in the plurality of fans by comparing the information associated with each fan in the plurality of fans to information associated with a software model of a fan.

20. The system of claim 15, wherein the fan failure detection and reporting logic is configured to generate the notification that at least identifies the problem fan by associating a severity rating with the problem fan and including the severity rating in the notification.

* * * * *